United States Patent [19]

Schmidt et al.

[11] Patent Number: 5,022,723
[45] Date of Patent: Jun. 11, 1991

[54] PANORAMIC PERISCOPE FOR TWO SPECTRUM RANGES

[75] Inventors: Horst Schmidt, Wetzlar-Nauborn; Reinhold Schmidt, Solms, both of Fed. Rep. of Germany

[73] Assignee: Wild Leitz GmbH, Wetzlar, Fed. Rep. of Germany

[21] Appl. No.: 379,115

[22] Filed: Jul. 13, 1989

[30] Foreign Application Priority Data

Jul. 13, 1988 [DE] Fed. Rep. of Germany ....... 3823647

[51] Int. Cl.⁵ ...................... G02B 23/04; G02B 23/08; G02B 23/16; G02B 27/10
[52] U.S. Cl. ...................................... 350/1.2; 350/541
[58] Field of Search ........................ 350/1.2, 538–544, 350/502

[56] References Cited

U.S. PATENT DOCUMENTS

| | | | |
|---|---|---|---|
| 3,539,243 | 11/1970 | Scidmore | 350/541 |
| 3,549,231 | 12/1970 | Scidmore et al. | 350/538 |
| 4,108,551 | 8/1978 | Weber | 356/4 |
| 4,260,217 | 4/1981 | Traeger et al. | 350/1.2 |
| 4,626,905 | 12/1986 | Schmidt | 358/87 |

FOREIGN PATENT DOCUMENTS 2746076 10/1977 Fed. Rep. of Germany .
3326904 2/1986 Fed. Rep. of Germany .
3515428 10/1986 Fed. Rep. of Germany .

*Primary Examiner*—Jon W. Henry
*Attorney, Agent, or Firm*—Foley & Lardner, Schwartz, Jeffery, Schwaab, Mack, Blumenthal & Evans

[57] ABSTRACT

The panoramic periscope has a panoramic head and a tube. In the panoramic head is mounted a viewing mirror movable in elevation and azimuth, upstream of which is arranged an at least bispectral front window. Various measuring or observation devices, for example a daylight and night vision device and a laser rangefinder, are provided in the tube. Panoramic head and tube are connected to one another by an optically transmitting component such as a transparent cylinder or by webs. As a result, the visual beam path can be reflected out laterally by means of a spectrum divider, so that the latter can be arranged in the observation beam path immediately downstream of the viewing mirror in the upper tube portion. In addition to a compact design, this also makes possible a separate, better optimization of the optical systems for the daylight and night vision range.

16 Claims, 2 Drawing Sheets

PANORAMIC PERISCOPE FOR TWO SPECTRUM RANGES

BACKGROUND OF THE INVENTION

The invention relates to an optical device for at least bispectral imaging. In particular, the invention relates to a panoramic periscope having a panoramic head in which is mounted a viewing mirror movable in elevation and azimuth which has an at least bispectral front window, and having a tube in which are arranged a plurality of, and preferably at least three, different measuring or observation devices, the viewing mirror directing their beam paths coaxially through the front window.

German Patent 2,746,076 discloses a panoramic periscope having a switchable daylight and thermal optical imaging system which has a transmitting entrance window for both spectrum ranges, downstream of which is arranged a viewing mirror movable in elevation and azimuth which directs the imaging beams coaxially onto the imaging optics associated with them. A front objective of germanium having a central bore and a front diaphragm are arranged between the viewing mirror and the input objective for the daylight optical imaging system. The gemanium component with a central bore serves as the front objective for the IR beam and allows the visual beam to pass. Although this component remains in position for observation of both the visual spectrum range or the IR spectrum range, various other optical elements must be inserted or removed when switching from the daylight to the thermal optical imaging system or from the thermal to daylight system. A distance-measuring device is not provided in this known arrangement.

German Offenlegungsschrift 3,515,428 discloses a panoramic periscope with change of magnification, laser range-finder and night observation member. The periscope has a viewing head with a gyrostabilized viewing mirror movable about an elevation axis and an azimuth axis, a lower part with an eyepiece system, and a central part which is arranged firmly on a mount and on the one hand carries the viewing head and on the other hand is used for securing the lower part. The central part of this known periscope contains a fixed principal optical system of the apparatus arranged downstream of the viewing mirror, for daylight and night observation, for laser reception and at least in part for the change of magnification and further optical components upstream of a spectrum divider. The space requirement of this arrangement is thus relatively large and an optimization of the overall optical systems for the daylight and IR range is difficult because the principal optical system is fixed. Another disadvantage of this system is that a prism within the system must be inserted when switching from day to night observation.

SUMMARY OF THE INVENTION

The invention is accordingly based on the object of providing a panoramic periscope of the type mentioned at the outset which, while having a broad range of possible applications, is nevertheless of compact construction and makes possible in a simple manner a separate optimization of the optical systems for the daylight and night vision range.

Another object of the invention is to provide a panoramic periscope of compact construction.

Another object of the invention is to provide a panoramic periscope which is able to provide for simultaneous viewing of visible and IR images.

A further object of the invention is to provide a panoramic periscope which utilizes separate optical systems for daylight and night observation.

Still another object of the invention is to provide a panoramic periscope for which no optical components must be inserted or removed when switching observation from one spectrum to another.

It is also an object of the invention to provide a panoramic periscope for which the viewing mirror and panoramic head can be rotated without rotating the other elements of the system.

A further object of the invention resides in providing a panoramic periscope for which the spectrum divider can be rotated about a vertical axis. These and other objects of the invention are achieved by a panoramic periscope comprising:

a. a panoramic head;

b. a viewing mirror movable in elevation and azimuth mounted in said panoramic head;

c. a front window or windows of said panoramic head which transmit at least two spectrum ranges;

d. a tube containing at least one measuring or observation device, said viewing mirror directing a beam path of each device coaxially through said front window;

e. a component through which one of said at least two spectrum ranges can be transmitted laterally out to be viewed and which couples said panoramic head with said tube; and f. a spectrum divider positioned in an upper portion of said tube, and in the beam path of incoming radiation directed by said viewing mirror, to direct a first spectrum range in one direction and a second spectrum range in a second direction.

Other objects and advantages of the invention will become apparent from the following description of the preferred embodiments of the invention taken in conjunction with the accompanying drawings. In these, components which are known or are not necessary for the understanding of the invention have not been illustrated.

DETAILED DESCRIPTION OF THE PREFERRED EMBODIMENTS

Figure 1:
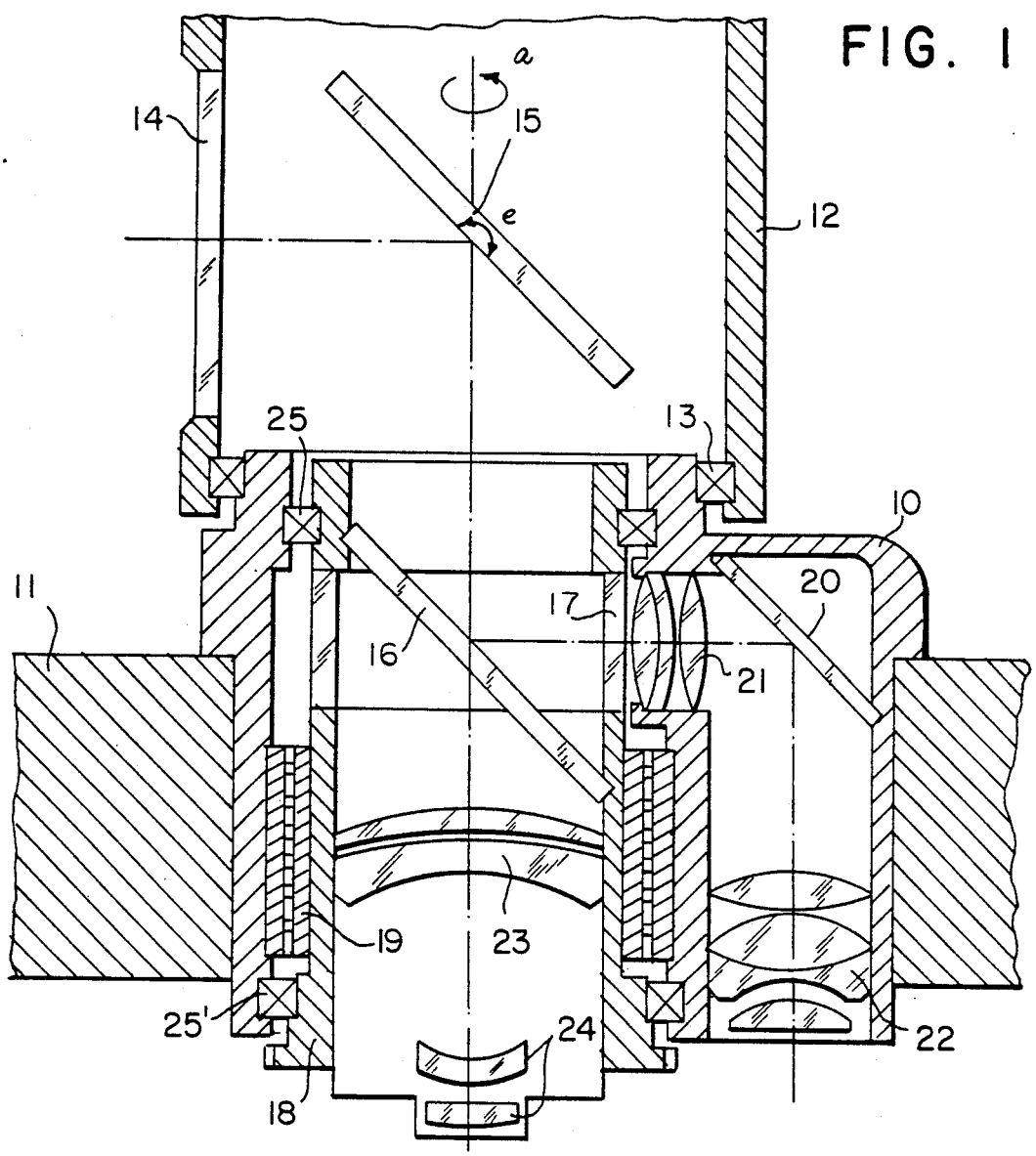
FIG. 1 is a cross-sectional side view of the panoramic periscope according to the invention.

The panoramic periscope shown in FIG. 1 has a tube 10 which is rigidly connected to a supporting wall 11, for example of a vehicle. On the tube 10 and above the supporting wall 11 a panoramic head 12 is arranged on a ball bearing 13 so as to be rotatable through $n \times 360°$.

The panoramic head 12 has a bispectral front window 14, behind which is mounted a viewing mirror 15 movable in elevation, as indicated schematically by the arrow e, and in azimuth, as indicated schematically by the arrow a. A spectrum divider 16 inclined at 45° is secured in the observation beam path within the tube 10, immediately downstream of the viewing mirror 15. The subject light entering through the front window 14 and deflected perpendicularly by the viewing mirror 15 onto the spectrum divider 16 is split by the latter into a visible spectrum range and an IR spectrum range. The visual beam component is reflected out by means of the spectrum divider 16 through an optically transmitting component 17 and forms the beam path for daylight observation.

The optically transmitting component 17 couples the panoramic head 12 to the tube 10 and in this embodiment is designed as a transparent cylinder, for example, of organic glass, e.g., polymeric material. According to another embodiment, not shown here, a transparent polygon can be provided as the optically transmitting component. The optically transmitting component 17 is connected at its lower edge to a cylindrical casing 18 and has electrical transparent conductor tracks which are electrically connected to a slip ring 19. This slip ring surrounds the casing 18 concentrically and contains signal and control lines, for example, for the stabilization of the viewing mirror 15.

After deflection at a reflection element 20 and passage through an objective and eyepiece system 21, 22, the visual beam reflected out by the spectrum divider 16 is guided to a daylight viewing device, which is not shown here since it is known. The image produced by the latter of the object to be observed can then be viewed or recorded.

After deflection via the viewing mirror 15, the IR beams coming from the object pass through the spectrum divider 16 and via an IR objective 23 and an IR eyepiece 24 to a thermal imaging device, also not shown here, such as that described, for example, in German Offenlegungsschrift 3,326,904.

The tube 10 of the panoramic periscope is furthermore equipped with a laser range-finder, likewise not shown here, described in more detail in the above cited Offenlegungsschrift. The cylindrical casing 18 and slip ring 19 can be rotated together with spectrum divider 16, IR objective 23 and IR eyepiece 24 on an azimuthal bearing 25,25' which is formed by ball bearings.

Figure 2:
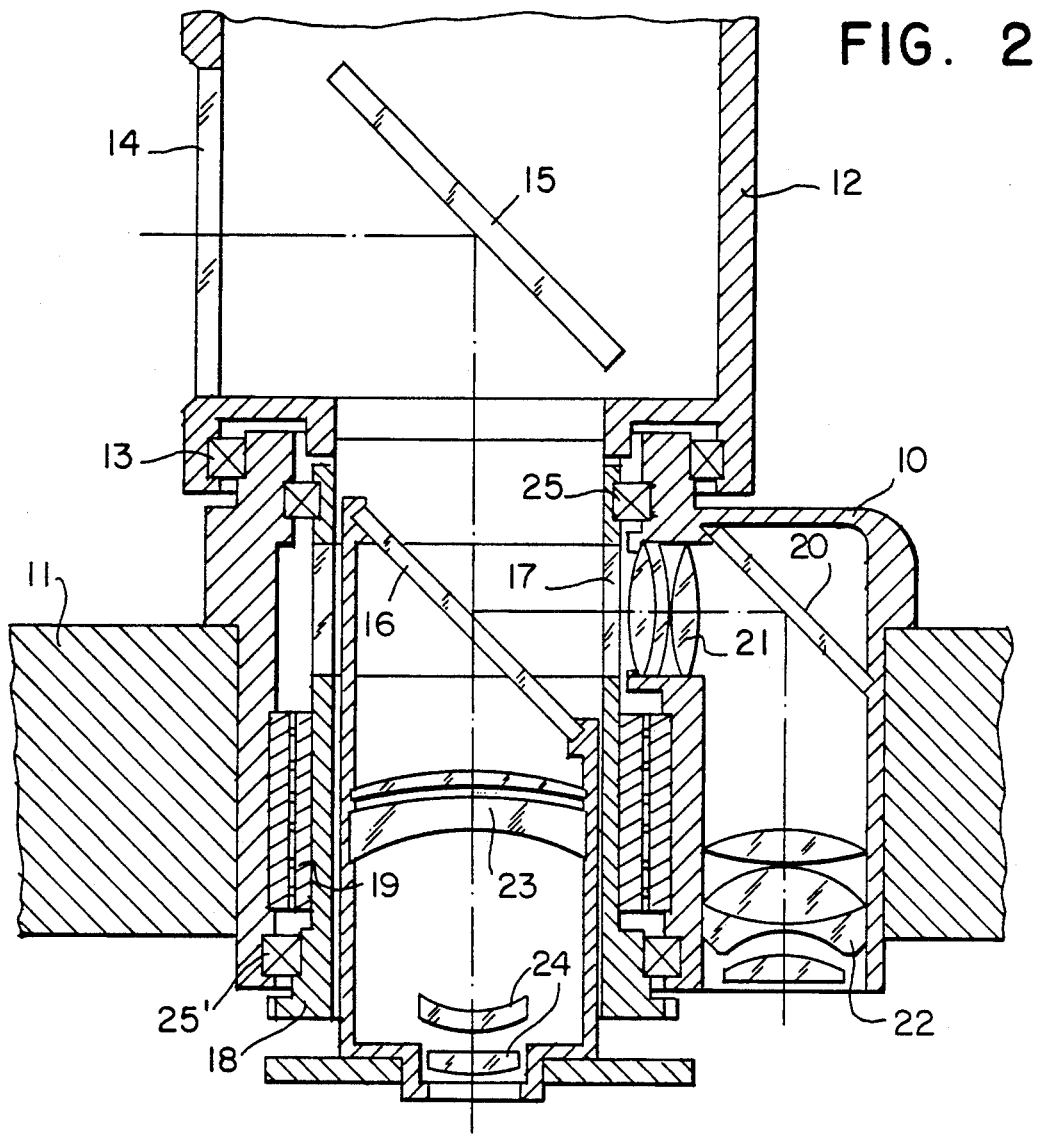
FIG. 2 is a cross-sectional side view of the panoramic periscope illustrating a second embodiment of the invention.

FIG. 2 illustrates a second embodiment of the invention which differs from the embodiment shown in FIG. 1 in that the spectrum divider 16 and IR objective 23 are stationary and not rotatable with the casing 18 and the optically transmitting component 17. In this embodiment when the panoramic head 12 and the viewing mirror 15 are rotated only casing 18 and optically transmitting component 17 in tube 10 are also rotated.

Figure 3:
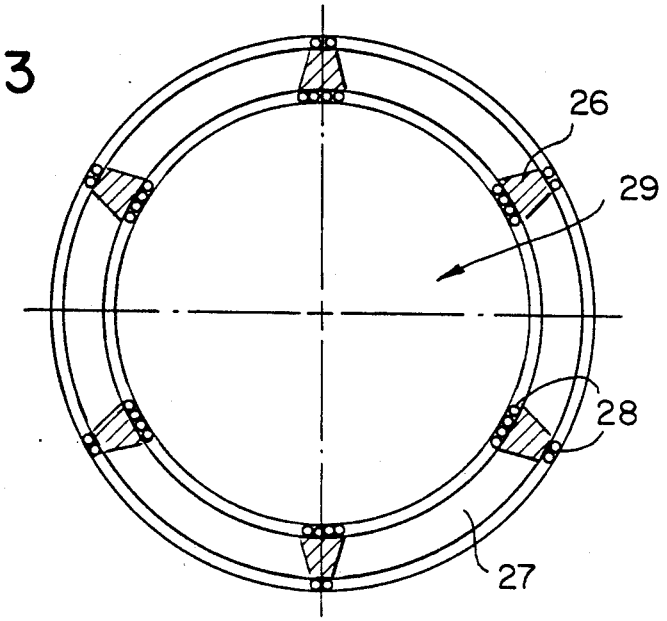
FIG. 3 is an isolated axial plan view of an alternative embodiment of the optically transmitting member.
Figure 4:
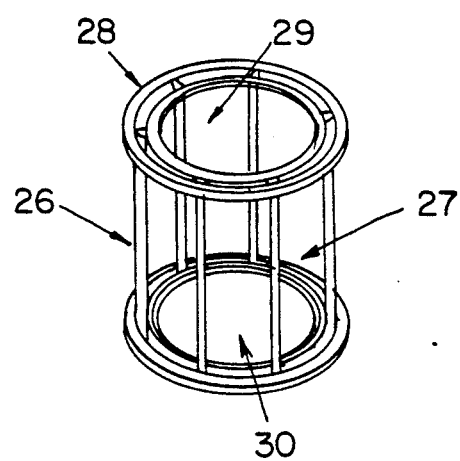
FIG. 4 shows a side view of the embodiment according to FIG. 3.

The exemplary embodiment shown in FIG. 3 is distinguished from that in accordance with FIG. 1 by the fact that a cage-like structure having webs 26 is provided for coupling the panoramic head 12 to the tube 10. FIG. 4 illustrates the webs, fixed at their upper and lower ends with rings 28, forming a "cage." The rays for all beams are reflected vertically downward by mirror 15 through opening 29 onto the spectrum divider 16. The spectrum divider 16 then reflects the rays of the visual beam laterally through one or more of the openings 27 between the webs 26 into the tube 10. The rays for the IR beam path are transmitted through the spectrum divider 16. After passing through the spectrum divider 16 the IR rays travel vertically downwardly and pass through opening 30 toward IR objective 23. In this case, the webs 26 are provided with cable guides 28 for electric leads.

The novel panoramic periscope is constructed in known manner on the modular principle from individual subassemblies.

What is claimed is:

1. A panoramic periscope comprising:
   a. a panoramic head;
   b. a viewing mirror movable in elevation and azimuth mounted in said panoramic head;
   c. a front window or windows of said panoramic head which transmit at least two spectrum ranges;
   d. a tube containing at least one measuring or observation device, said viewing mirror directing a beam path of each said device coaxially through said front window;
   e. a component through which one of said at least two spectrum ranges can be transmitted laterally out to be viewed and which couples said panoramic head with said tube; and
   f. a spectrum divider positioned in an upper portion of said tube and in the beam path of incoming radiation directed by said viewing mirror, to direct a first spectrum range in one direction and a second spectrum range in a second direction.

2. A panoramic periscope as claimed in claim 1, wherein said first spectrum range is the visible spectrum range.

3. A panoramic periscope as claimed in claim 2, wherein said second spectrum range is the infra-red spectrum range.

4. A panoramic periscope as claimed in claim 1, wherein said component comprises a transparent cylinder.

5. A panoramic periscope as claimed in claim 1, wherein said component comprises a transparent polygon.

6. A panoramic periscope as claimed in claim 1, wherein said component comprises a cage formed by webs separated by spaces and one of said at least two spectrum ranges passes through the spaces between said webs.

7. A panoramic periscope as claimed in claim 1, wherein said panoramic head is connected to said tube via ball bearings so that said panoramic head is rotatable through 360 degrees.

8. A panoramic periscope as claimed in claim 1, further comprising a casing connected for rotation with said panoramic head and containing said component, and further comprising means for mounting said spectrum divider non-rotatably with respect to said casing.

9. A panoramic periscope comprising:
   a. a housing;
   b. a first component of said housing which transmits at least two spectrum ranges;
   c. A viewing mirror movable in elevation and azimuth mounted in said housing;
   d. a spectrum divider mounted within said housing wherein said viewing mirror directs the incoming radiation onto said spectrum divider and said spectrum divider directs a first spectrum range in one direction and a second spectrum range in a second direction; and
   e. a second component of said housing through which at least one spectrum from said spectrum divider is transmitted laterally for viewing, wherein said second component comprises a transparent cylinder.

10. A panoramic periscope as claimed in claim 9, wherein said first spectrum range is the visible spectrum.

11. A panoramic periscope as claimed in claim 10, wherein said second spectrum range is the infra-red spectrum range.

12. A panoramic periscope as claimed in claim 9, wherein said housing further comprises a panoramic head, in which said viewing mirror is mounted, and a tube.

13. A panoramic periscope comprising:
a. a housing;
b. a first component of said housing which transmits at least two spectrum ranges;
c. a viewing mirror movable in elevation and azimuth mounted in said housing;
d. a spectrum divider mounted within said housing wherein said viewing mirror directs the incoming radiation onto said spectrum divider and said spectrum divider directs a first spectrum range in one direction and a second spectrum range in a second direction; and
e. a second component of said housing through which at least one spectrum from said spectrum divider is transmitted laterally for viewing, wherein said second component comprises a cage formed by webs separated by spaces and wherein one of said at least two spectrum ranges passes through the spaces between said webs.

14. A panoramic periscope as claimed in claim 13, wherein said first spectrum range is the visible spectrum.

15. A panoramic periscope as claimed in claim 14, wherein said second spectrum range is the infra-red spectrum range.

16. A panoramic periscope as claimed in claim 13, wherein said housing further comprises a panoramic head, in which said viewing mirror is mounted, and a tube.

* * * * *